(12) United States Patent
Hartley

(10) Patent No.: US 6,763,360 B2
(45) Date of Patent: Jul. 13, 2004

(54) AUTOMATED LANGUAGE AND INTERFACE INDEPENDENT SOFTWARE TESTING TOOL

(75) Inventor: David J. Hartley, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 339 days.

(21) Appl. No.: 09/947,893

(22) Filed: Sep. 6, 2001

(65) Prior Publication Data

US 2003/0046312 A1 Mar. 6, 2003

(51) Int. Cl.$^7$ .............................................. G06F 17/00
(52) U.S. Cl. ................................... 707/102; 707/104.1
(58) Field of Search ............................. 707/203, 104.1, 707/100, 102, 1–6, 103 R, 103 Y, 103; 717/124, 125, 126, 127, 131; 714/1, 25, 38

(56) References Cited

U.S. PATENT DOCUMENTS

| | | | | |
|---|---|---|---|---|
| 5,485,600 A | * | 1/1996 | Joseph et al. | 703/13 |
| 5,758,061 A | * | 5/1998 | Plum | 714/35 |
| 6,460,147 B1 | * | 10/2002 | Cox | 714/38 |
| 6,557,120 B1 | * | 4/2003 | Nicholson et al. | 714/38 |
| 6,701,519 B1 | * | 3/2004 | Cowan | 717/130 |

OTHER PUBLICATIONS

Chays et al "A framework for testing database applications", ACM 2000, pp. 147–257.*

Fosse et al "Statemate applied to statistical software testing", ACM 1993, pp. 99–109.*

Rothermel et al "Selecting tests and identifying test coverage requirements for modified software", ACM 1994, pp. 169–184.*

Conradi et al "Version models for software configuration management", ACM 1998, pp. 232–282.*

(List continued on next page.)

*Primary Examiner*—Uyen Le
(74) *Attorney, Agent, or Firm*—Workman Nydegger

(57) ABSTRACT

Measuring the reliability of a version of a software module in a customized manner that is independent of the written language used by versions of the software module to output objects. Language independent state tables may be generated from one version of a software module and then used to facilitate measuring the reliability of other versions of the software module. During the testing process, standardized pointers are used to reference objects that are common to a plurality of versions of a software module. Parameters representative of an actual state of a software module are compared to parameters representative of an anticipated state of the software module to determine if an action has performed as intended. Customized functions may be automatically loaded during the testing process and may receive data standardized for use with a plurality of version of a software module via common function headers.

46 Claims, 8 Drawing Sheets

U.S. PATENT DOCUMENTS

Peter A. Vogel "An integrated general purpose automated test environment", ACM 1993, pp. 61–69.*

C.V. Ramamoorthy et al. On the Automated Generation of Program Test Data IEEE Transactions on Software Engineering, USA, vol. SE–2, No. 4, Dec. 1976 pp. 293–300.

Edited By E. Nahouraii Proceedings of the Second Symposium on Assessment of Quality Software Development Tools (Cat. No. 92TH0415–0), Publ by IEEE Comput. Soc. Press, Los Alamitos, CA, USA, 1992 pp. 1–31, 127–162, 285–319.

P.K. Devanbu et al. Automated Construction of Testing and Analysis Tools, Proceedings of 16th International Conference on Software Engineering, Publ. by IEEE Comput. Soc. Press, Los Alamitos, CA, USA, 1994 pp. 241–250.

P.K. Devanbu et al. Generating Testing and Analysis Tools with ARIA ACM Transactions on Software Engineering and Methodology, Published by ACM, USA, vol. 5, No. 1, Jan. 1996 pp. 42–62.

R.A. DeMillo Progress Toward Automated Software Testing 13th International Conference on Software Engineering (Cat. No. 91CH2982–7) Published by IEEE Comput. Soc. Press, Los Alamitos, CA, USA, 1991 pp. 180–3.

W.H. Jessop et al. Atlas–An Automated Software Testing System 2nd International Conference on Software Engineering, Published by IEEE, New York, NY, USA, 1976 pp. 629–635.

* cited by examiner

```
[Extracted]
STR_314_0=Clear
STR_314_1=Clear Entry
STR_314_2=Clear Memory
STR_314_3=1/x
STR_314_4=0.
STR_314_5=.
STR_314_6=Cannot divide by 0.
STR_314_7=Sqrt
STR_314_8=Store in Memory
STR_314_9=Result is too large.
STR_314_10=Result is undefined.
STR_313_8=Calculator
STR_313_9=Copy  (Ctrl+C)
STR_313_10=Paste  (Ctrl+V)
STR_313_11=Standard
STR_313_12=Pop-Up
STR_313_13=Standard View  (Ctrl+S)
STR_313_14=Pop-Up View  (Ctrl+P)
STR_313_15=Add to Memory
MNU_103_POPUP0=&File
MNU_103_65=E&xit
MNU_103_POPUP1=&Edit
MNU_103_68=&Copy  Ctrl+C
MNU_103_69=&Paste Ctrl+V
MNU_103_78=C&lear Paper Tape Ctrl+D
MNU_103_POPUP2=&View
MNU_103_71=&Standard    Ctrl+S
MNU_103_70=&Pop-Up      Ctrl+P
```

FIG. 6

```
[Extracted]
STR_314_0=Effacer
STR_314_1=Effacer l'entrée
STR_314_2=Effacer la mémoire
STR_314_3=1/x
STR_314_4=0.
STR_314_5=.
STR_314_6=Impossible de diviser par 0.
STR_314_7=Rac
STR_314_8=Enregistrer en mémoire
STR_314_9=Résultat trop grand.
STR_314_10=Résultat indéfini.
STR_313_8=Calculatrice
STR_313_9=Copier  (Ctrl+C)
STR_313_10=Coller  (Ctrl+V)
STR_313_11=Standard
STR_313_12=Contextuel
STR_313_13=Affichage standard (Ctrl+S)
STR_313_14=Affichage contextuel  (Ctrl+P)
STR_313_15=Ajouter à la mémoire
MNU_103_POPUP0=&Fichier
MNU_103_65=&Quitter
MNU_103_POPUP1=&Edition
MNU_103_68=Co&pier        Ctrl+C
MNU_103_69=C&oller Ctrl+V
MNU_103_78=E&ffacer le rouleau        Ctrl+D
MNU_103_POPUP2=&Affichage
MNU_103_71=&Standard     Ctrl+S
MNU_103_70=Con&textuel  Ctrl+P
```

FIG. 7

AUTOMATED LANGUAGE AND INTERFACE INDEPENDENT SOFTWARE TESTING TOOL

BACKGROUND OF THE INVENTION

1. The Field of the Invention

The present invention relates to measuring the reliability of software modules. More specifically, the present invention relates to systems, methods, and computer program products for generating language independent state tables usable when measuring the reliability of different versions of a software module, automatically verifying that a version of a software module performed an action as intended, and performing customized testing functions associated with a version of a software module.

2. Background and Relevant Art

Software vendors often release software products, such as user interfaces and application programs, in a variety of written languages and for use on a variety of computer platforms. This is in large part due to the number of differently configured computer systems operating worldwide in different countries. If a software product is released in a variety of languages and/or for use with a variety of computer platforms, finding and predicting the severity of defects (or "bugs") in the software product becomes very important.

Many consumers install a wide variety of software products on any given computer system. These software products must interact in a manner that does not corrupt data or cause the computer system to crash. To decrease the chances of such problems occurring, it is beneficial to measure the reliability of software products under a wide array of different circumstances. Thus, versions of software products in different written languages may often be tested for use on a variety of computer platforms.

One conventional approach to measuring software reliability is to hire and train skilled software testers to systematically exercise a software product to find bugs. However, this approach to testing is highly labor intensive, and it is often very expensive to hire and train testers. Also, there is also some likelihood that a tester may miss a critical function of a software product or an interaction between several software products, which may allow a defect to go undiscovered and thus uncorrected.

Another conventional approach to measuring software reliability is to send a partially complete software product out to a large population of users to test the product. However, it is often expensive to create a software product, even one with partial functionality, and distribute it to a large number of users. Additionally, competitors of a software vendor may obtain a pre-release version of the product thus reducing the product's competitive advantage. There are also logistical problems associated with obtaining any useful information about a software product when test reports are received from a large number of users. Furthermore, similar to skilled software testers, users of a pre-release version of a software product may miss critical functions.

To lessen the chance for human error when testing the reliability of a software product, many vendors began creating batteries of automated software tests. These tests simulate actions that a user may typically cause a software product to perform. However, conventional automated test batteries have some inherent problems: batteries of tests are expensive to create and maintain; they are often self-contained and do not interact with other testing programs; and they often test only a small portion of the software modules included in a software product. Since different batteries of tests are often self-contained and incompatible, batteries for individual software products must be individually coded. This is time consuming, may require substantially technical expertise on the part of the tester, and increases the chance of introducing human error into the testing process.

More recent approaches to testing software reliability use a modular approach where different testing modules perform different functions of the testing process. A state table editor may be used to create databases called state tables, which include object values and actions associated with particular states of a target software product. State tables may be created by entering some information manually and detecting and retaining other information from an operating system. Detected and retained information may include operating system values, such as the values associated with buttons, scrollbars and dialog boxes, and user actions, such as mouse clicks and keyboard typing, into a database.

A state table contains various entries, each entry representing a state that the software module may potentially enter. For each potential state, there is a list of actions that are available once that state is entered. For each possible action, the state table may include a pointer to the state that the software module should enter if that action is performed. For each possible action, the state table may store a likelihood that a user may perform that action given that state.

To test a software module included in a software product, a state table runner "reads" a state table entry corresponding to a particular state and causes a software module to perform an action associated with that state, based on a likelihood percentage assigned to the action. For example, if a state table likelihood for a particular action equals 10%, the state table runner will perform this action one out of every ten times that it enters the particular state. Thus, unlike testing methods employing human testers, the likelihood of executing functions with a higher or lower probability than they would actually occur is reduced. The state table runner is also capable of verifying that a correct result occurred when an action is performed and of detecting the level of failure of an action. As the state table runner performs the actions included in the state table, it may record each action it performs and the result of performing the action While conventional modular approaches provide benefits when compared to human testing or hard-coded automated testing methods, they also have certain problems. For a reliability test to provide meaningful results, a state table associated with a software module must be properly configured before a state table runner reads the state table. State table runners rely heavily on text string values included in tested software modules, such as window titles and dialog box contents, when determining if an action performed as intended. In a state table, these text strings are often hard-coded, which may require an individual to manually enter the text strings.

The problem is significantly compounded when versions of a software application are created in different languages. If an English, German, and French version of a software product is to be released, text strings associated with each language may need to be manually entered into separate state tables, where a state table is dedicated for each language version. Additionally, the need to manually edit an existing state table may arise when developers of a software product change text strings included in the product. Manually entering or editing text string values in a state table increases the operational complexity associated with testing, consumes time, and increases the chance that human error will be introduced into the testing process.

Another problem is that different versions of a software product may exist for different computer platforms. That is, a version of a software product designed for use on mobile devices may operate differently on a cell phone than on a personal digital assistant. Thus, when using conventional modular approaches to test a software product, a separate state table may need to be created for each computer platform compatible with a version of the product. Furthermore, if customized testing functions are to be performed such as actions not included in the functionality of a generic state table runner, these functions may need to be coded into different versions of a state table runner specifically designed for each computer platform. Coding a state table runner is time consuming, increases the chance of introducing human error into the testing process, and may require significant technical expertise.

Therefore, what are desired are systems, methods, and computer program products for automatically testing the reliability of software modules in a language independent manner where verifications of a software module's state and simulating actions performed by a software module may be more easily customized.

BRIEF SUMMARY OF THE INVENTION

The principles of the present invention provide for automatically testing the reliability of software modules in a language independent manner. A state table editor uses standardized pointers, which are common to a number of versions of a software module, to associate states included in a state table to objects included in a tested software module. Additionally, customized verifications and actions may easily be added when testing versions of software modules associated with different user interfaces and computer system platforms. Loadable program modules, which receive standardized data via common headers, may be used to facilitate these customized verifications and actions.

Language independence is facilitated by performing actions and verifications included in a language independent state table. To generate a language independent state table, a resource file is accessed to locate pointers that are standardized across different versions of a software module. In one instance, existing IDN files may be accessed to locate keys associated with the objects of a software module. The standardized pointers may then be received by a state table editor, which includes the standardized pointers in a state table associated with the software module. Since the keys reference objects, instead of the values of objects, no modifications need be made to a state table if a developer changes a portion of an object, because the key still references the correct object. As a result, the same state table may be used for a number of versions of a software module, each of which outputs similar objects, but in a different written language. The efficiency in measuring the reliability of a software module is greatly increased when one state table may be used to facilitate testing for a number of software module versions.

In operation, methods of the present invention may verify that an action performed by a software module produced the intended result. In one embodiment, the standardized pointer is used to retrieve parameters representative of an anticipated state. An anticipated state is a state that a software module should transition into when an action is performed. The retrieved parameters may include strings of text, such as the title or contents of a dialog box, that are included in a resource file.

In a separate operation, an action may be performed that causes a software module to transition to an actual state. An actual state is a state a software module transitions into as a result of performing an action. This may include a state table runner evaluating the various actions available given its current state, and then performing an action according to the likelihood assigned to that action. Such actions may include, for example, clicking a mouse button at a particular location, and/or pressing keys on a keyboard.

It is then determined that the actual state and the anticipated state have one or more representative parameters that are at least a partial match. If information representative of an actual state and an anticipated state satisfy a predetermined level of commonality, this may verify that the action preformed as intended. Depending on the strictness of the rules involved when comparing information or parameters, this may be determined in a variety of ways. If one or more parameters representative of the states partially match, this may be enough to verify that an action performed as intended. In some cases, only a complete match of parameters may result in verification. In other cases, a partial or complete match of different representative parameters may result in verification. Comparisons to determine if representative parameters are a partial or complete match may be performed on visual objects of a display, such as text associated with the title or contents of a dialog box.

Using standardized pointers to facilitate retrieval of information from existing resource files and comparing information representative of an anticipated state and an actual state significantly reduces the chance of human error due to entry of erroneous data and significantly reduces the operational complexity associated with testing.

Customized actions and verifications for specific software modules are facilitated through the use of loadable program modules, which include functionality not otherwise available during the testing process. Loadable program modules are created with common headers that, when called, receive standardized data about a state of the software module. Although a loadable program module receives standardized data, the programming instructions contained therein may be coded to perform customized functions for different versions of a software module or computer platform. As a result, adding customized functionality does not require modifying the code of an existing state table runner. Groups of loadable modules common to a software module or computer platform may be included in libraries, such as dynamic link libraries ("DLLs").

In operation, performance of a selected function is requested. The request may be caused by a software module or computer system platform. As a result of the request, at least one customized function is loaded from a source external to a state table runner. Loaded customized functions may be included in a DLL that is referenced in a configuration file associated with a state table runner. Customized functions may also be specific to a software module or computer platform.

Information representative of a state of a software module is then sent to the selected function. This information may be sent via a function header that is common to a number of software modules or computer platforms. The instructions of the selected function are then processed. Processing the instructions of the selected function may cause performance of an action or verification that was customized for a particular software module or computer platform.

Thus, previously created loadable program modules may be used to add customizable actions and verifications when testing a software module. This reduces the level of technical expertise needed to perform tests and reduces the chance that human error will be entered into the testing process.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 illustrates an example of an English version of a resource file.

FIG. 7 illustrates an example of a French version of a resource file.

DETAILED DESCRIPTION OF THE PREFERRED EMBODIMENTS

Figure 1:
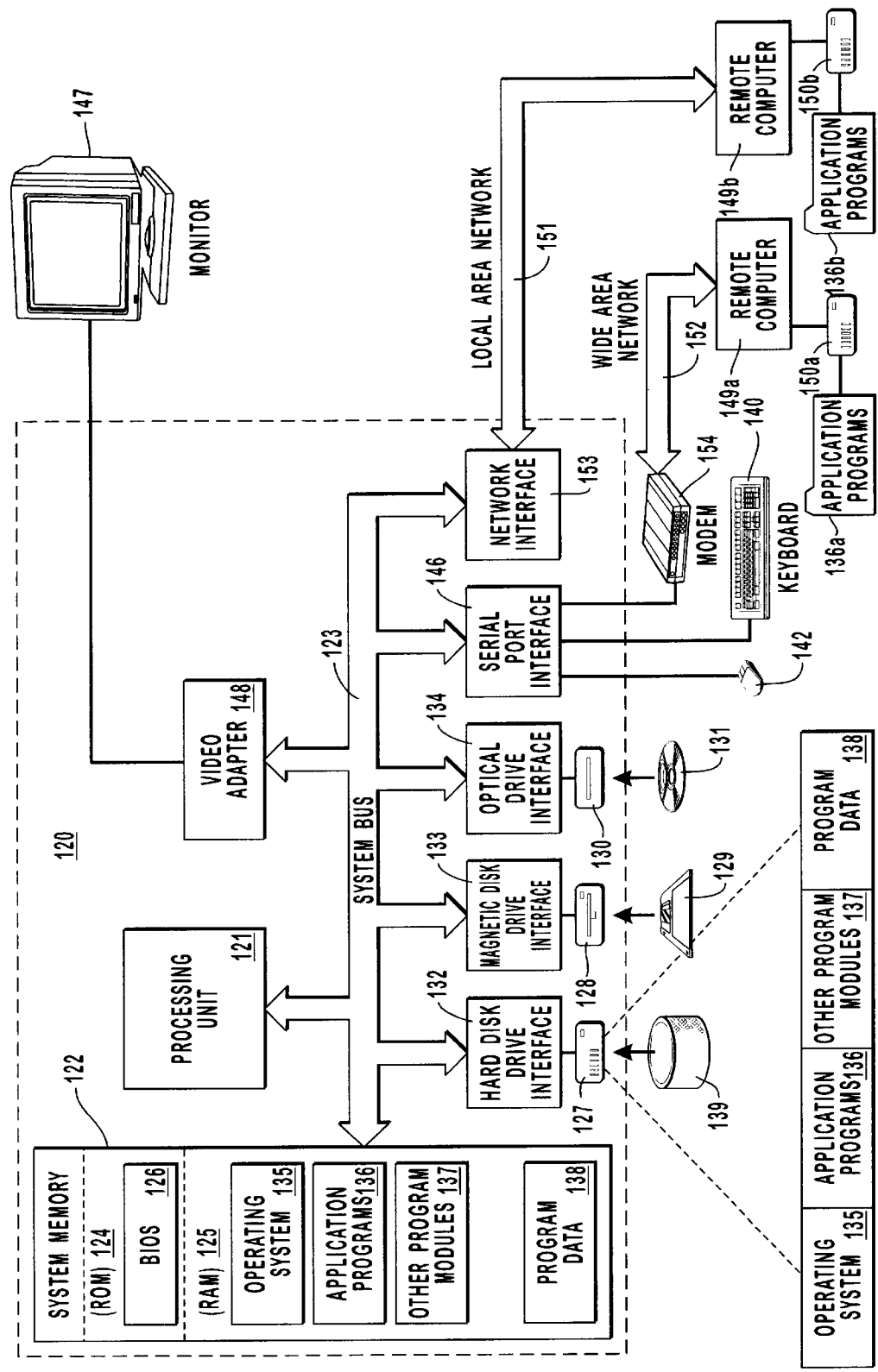
FIG. 1 illustrates an example processing system that provides a suitable operating environment for the present invention.

The present invention extends to systems, methods, and computer program products for automatically measuring the reliability of software modules independently of any written language. State tables that include standardized pointers to objects associated with one or more versions of a software module may be generated. Since these pointers reference objects, instead of values of associated with the objects, the values may be in any written language and may be changed without affecting the testing process. Functions that are customized for use with a particular software module or computer platform may automatically be loaded at the time they are requested.

During operation, a state table runner accesses a state table to retrieve data associated with causing a version of a software module to perform an action or data associated with verifying that an action performed as intended. A state table runner may use standardized pointers, which were accessed from a resource version of a software module, and are standardized for use with a number of versions of the software module. Thus, regardless of a written language used by a software module to output objects, one state table may be used for a several versions of the software module. When an action or verification is requested and a state table runner does not include the functionality to perform the action or verification, customized functions may be automatically loaded from sources external to the state table runner.

The embodiments of the present invention may comprise a special-purpose or general-purpose computer that includes various components, as discussed in greater detail below. Embodiments within the scope of the present invention may also include computer-readable media for carrying or having computer-executable instructions or data structures stored thereon. Such computer-readable media can be any available media that can be accessed by a general-purpose or special-purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general-purpose or special-purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general-purpose computer, special-purpose computer, or special-purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

With reference to FIG. 1, an example system for implementing the invention includes a general-purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the example environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b are illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

In this description and in the following claims, a "state" is defined as the current or last-known status, configuration, attributes, condition, or information content of an action or setting associated with a software module, user interface, or computing device. A state may be viewed as the combination of original values plus any modifications made to the values by the performance of an action. A state may be considered to be a node in some tree of nodes representing all possible states. A node or state may be associated with paths to other nodes, which may be represented by actions that may be performed. When a path is traversed, for example by the performance of an action, a transition from a previous node or state to a new node or state occurs. Software modules, user interfaces, and computing devices may be associated with a finite, albeit, large number of states.

In this description and in the following claims, a "state table" is defined as a set of data associated with one or more states of a software module, user interface, or computing device. The state table may define the tree of state nodes that represent all possible states, as well as transitions between those states, for a given software module.

In this description and in the following claims, a "state table editor" is defined as one or more software modules that may facilitate adding data to a state table, removing data from a state table, editing data included in a state table, and/or performing other data operations on data included in a state table.

In this description and in the following claims, a "state table runner" is defined as one or more software modules that may facilitate a software module performing actions and may facilitate verification that actions performed as intended. A state table runner may access a state table to facilitate performance of actions and verifications associated with a software module, user interface, or computing device. In one embodiment, a state table runner may access several state tables, performing actions and verifications included in each of the state tables. Conceptually, the state table runner uses the state table to run through the tree of state nodes from one node to another.

In the description and in the following claims, "resource-stripping" is defined as accessing information and routines associated with the states of a software module, user interface, or computing device without causing the software module, user interface, or computing device to actually operate in the states from which associated information is accessed. For example, a resource-stripping program may accept an executable version of a software module as input and return state information associated with the software module without causing the executable version of the software module to execute. A resource-stripping program may facilitate storage of stripped resources for later use.

In accordance with the present invention, program modules, including testing modules used to facilitate measuring the reliability of versions of software modules, as well as associated program data may be stored and accessed from any of the computer-readable media associated with computer system 120. For example, portions of testing modules, portions of versions of software modules, and portions of program data associated with both types of modules may be included in operating system 135, application programs 136, other program modules 137 and/or program data 138, for storage on magnetic hard disk 139. Execution of testing modules, execution of versions of software modules, and storage of associated data may be performed in a distributed environment as previously described. For example, testing modules included in a remote processing device, such as remote computer 149*a* or 149*b*, may facilitate measurement of the reliability of a version of a software module included in a local processing device, such as computer 120, or vice versa.

Figure 2A:
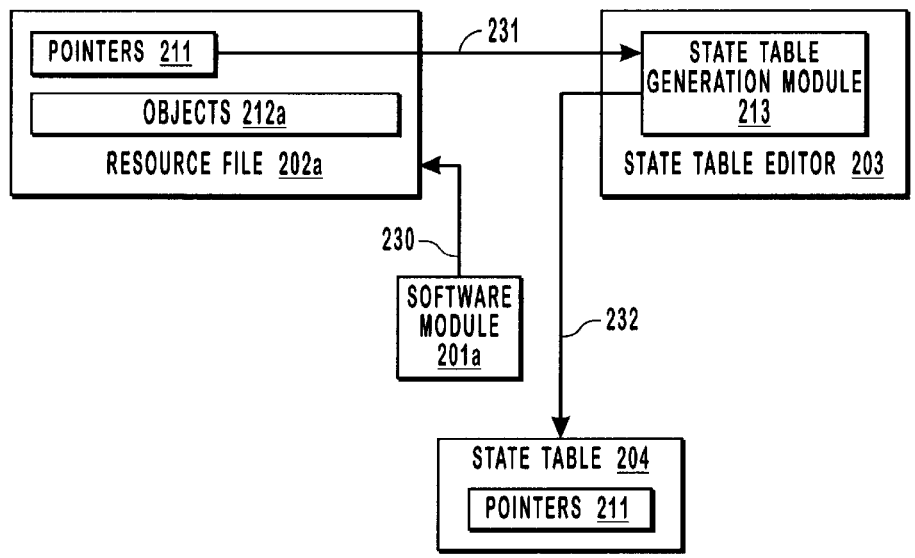
FIG. 2A illustrates an example of some of the functional components that may be used to create a state table.
Figure 3:
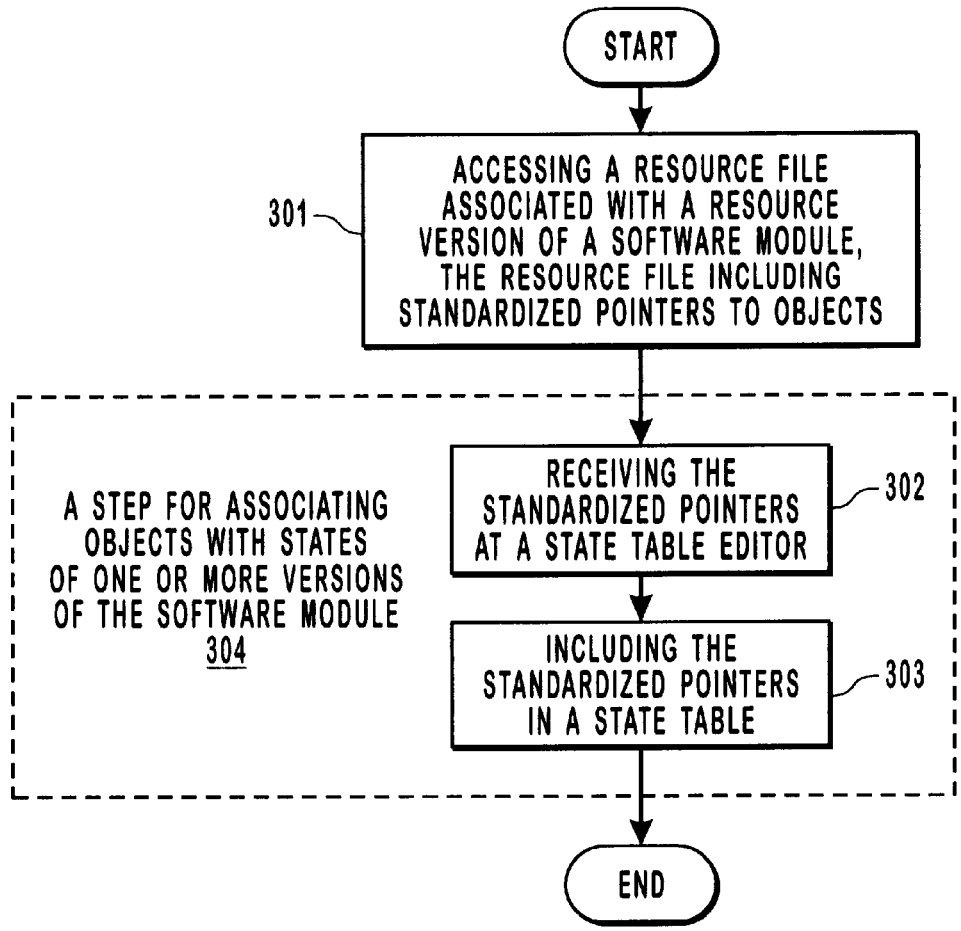
FIG. 3 is a flow diagram illustrating an example of a method for generating a language independent state table.

Testing modules may include a state table editor that facilitates generation of a state table. In one embodiment, a state table editor may synthesize information representative of a version of a software module from different locations, including existing resource files. This information facilitates generation of a state table that includes parameters representative of the version of the software module, including parameters representative of actions it may be caused to perform and of states in which it may operate. During a testing process, a state table may also facilitate access to additional information, including additional representative parameters and customized functions. This additional information may originate from a source external to the state table and the version of the software module. In one embodiment, a state table may facilitate access to existing resource files that were used in generation of the state table. Shown in FIG. 2A are some of the functional components that may be used to facilitate generation of a state table. Shown in FIG. 3 is a flow diagram illustrating a method for generating a language independent state table. The method in FIG. 3 will be discussed with reference to the functional components included in FIG. 2A.

Figure 2B:
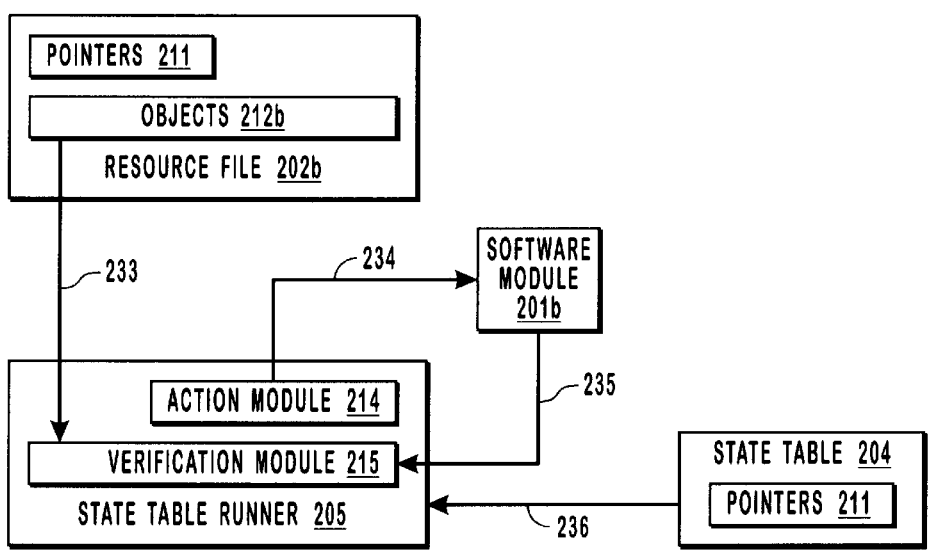
FIG. 2B illustrates an example of some of the functional components that may be used to verify an action performed as intended.
Figure 2C:
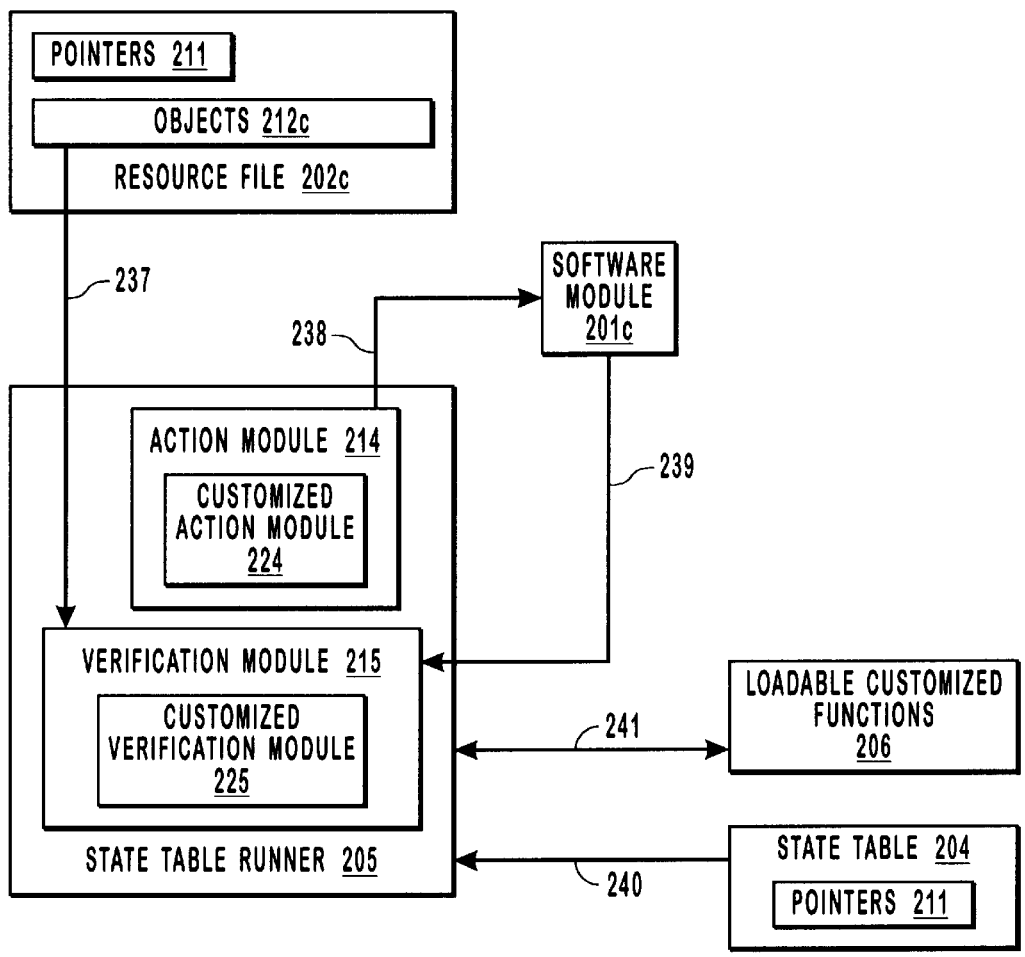
FIG. 2C illustrates an example of some of the functional components that may be used when performing a customized action or verification.

In FIG. 2A, as well as FIGS. 2B and 2C, lines between the functional components included therein represent logical communication paths. These communications paths, such as communication path 230 for example, may include system bus 123, wide area network 152, local area network 151, combinations thereof, or any other path that may facilitate the transport of electronic data. Communication paths may also include other program modules (not shown) that condition or format portions of data so as to make them accessible to the illustrated functional components. It may also be that the communication medium associated with a logical communication path changes during operation. For example, a module may exist on a remote computer, which is loaded to a local computer via a wide area network connection. After being loaded, the local computer may send information to a function header associated with the module via a system bus.

The method in FIG. 3 begins by accessing a resource file associated with a resource version of a software module, where the resource file includes standardized pointers to objects (act 301). A resource version of a software module may be any version of the software module that includes standardized pointers associated with other versions of the software module. Any version of a software module that includes standardized pointers may be deemed a resource version of the software module. In FIG. 2, software module 201*a* may be a resource version of a software module and may be one of a number of versions of the software module. Each version of the software module, when executed, may output objects, such as text, in a different written language. For example, a first version of a software module may output objects in English, while a second version of the software module, which operates essentially identically to the first version, may output objects in French.

In one embodiment, act 301 may include state table editor 203 accessing resource file 202*a* via communication path 231. Included in resource file 202*a* are pointers 211 and objects 212*a*, which may have been retrieved from software module 201*a* via communications path 230. In this embodiment, software module 201*a* functions as a resource version of the software module.

In one embodiment, communication path 231 may include a resource-stripping program (not shown). The resource-stripping program accesses software module 201*a* to facilitate retrieval of information representative of actions and states associated with software module 201*a*. Portions of the retrieved information may be pointers 211 and objects 212*a* that are included in resource file 202*a*. Objects 212*a* may include, for example, moving image data, sound data, text, graphics, or combinations thereof. One example of a resource file is an IDN file used in a Microsoft® Windows® environment.

An IDN file may include keys that reference objects and their associated values. Keys may reference window titles, dialog boxes, other visually output objects, as well as associated values. Keys may be similar to pointers in that a key may be used to find an address for an object. Separate IDN files may exist for a number of versions of a software module, each of which output objects in a different written language. FIG. 6 is an example of an IDN file that includes resources stripped from an English version of a software module and FIG. 7 is an example of an IDN file that includes resources stripped from a French version of the software module.

Both FIGS. 6 and 7 include a number of objects and their representative values. Illustrated on the third line in both FIGS. 6 and 7 is a reference to an object "STR_314_1". Shown in FIG. 6 this object has a value of "Clear Entry" and shown in FIG. 7 this object has a value of "Effacer l'entrée". As illustrated, the other objects in each of the IDN files are essentially identical, while the values associated with the objects differ according to the appropriate written language. Thus, if pointers 211 references objects retrieved from a resource version of a software module, and these same objects are included in other versions of the software module, pointers 211 may facilitate generation of state table that is usable when measuring the reliability of several versions of the software module. In one embodiment, pointers 211 may include keys associated with an IDN file. Using standardized pointers increases the efficiency in measuring the reliability of a software module, as only one state table is needed to test several versions.

When information representative of the state of software module 201*a*, such as an object, is in the form of text, this text may be encoded as characters of a character set. Encoding characters of text involves associating each character of a characters set with a unique number. When a software module or computing device interprets a number associated with a specific character, it knows it is performing operations on the associated character. For instance, the character "a" may be represented by the hexadecimal value 61. If character operations are performed on a hexadecimal value of 61, it may be known that these operations are being performed on the letter "a."

Characters of text may be encoded using virtually any technique that corresponds a number to a representation of a text character However, some encoding techniques are more common. The American Standard Code for Information Exchange ("ASCII") character set is a code for representing English characters, with each letter assigned a number between 0 and 127. The ISO Latin 1 character set is a superset of the ASCII character set, with each letter assigned a number between 0 and 255.

Having more numbers available for assignment increases the number of different characters available to a user of a character set. This may allow a character set to include special symbols and may allow one character set to be used between different languages. If a character set includes a large number of unique characters it may be termed a "unified character set." That is, if the characters of several written languages may be encoded in a single character set, each of the languages may be unified in using the single character set.

Unicode is an example of a unified character set, which may assign more than 65,000 unique characters. Unicode was developed to promote interoperability between programs and platforms that may currently be using differing encoding techniques. Since Unicode may represent over 65,000 unique characters, all the characters of most languages (including Greek, Chinese, and Japanese) may be included in one character set.

In the description, reference may be made to the text encoding techniques and character sets discussed above. However, the present invention is not limited to these text encoding techniques or character sets. It would be apparent to one skilled in the art, after having reviewed this description, that a wide variety of text encoding techniques and character sets may be used to implement the principles of the present invention.

Referring back to FIG. 3, a step may be performed for associating objects with operating states of one or more versions of a software module (step 304). This may include performing the acts of receiving pointers 211 at state table editor 203 (act 302) and including pointers 211 in state table 204 (act 303). In one embodiment, state table editor 203 includes state table generation module 213, which may include pointers 211, along with other information associated with software module 201a, in state table 204. When using IDN files, such as those illustrated in FIGS. 6 and 7, state table generation module 213 may include the keys associated with the objects of an IDN file in pointers 211. State table generation module 213 may also include user interface information, computer platform information, or other information representative of the state or actions associated with software module 201a, in state table 204.

A user interface is a set of commands or menus through which a user communicates with the program modules of a software product. Different modules associated with a software product may comprise a user interface for the software product. User interfaces are often associated with communicating with an operating system. One example of this is graphical user interfaces ("GUIs"), such as Microsoft® Windows®, which include windows, icons, pop-up menus and dialog boxes. However, program modules associated with an application program may also comprise a user interface. User interfaces may also be command driven where commands are entered to perform an action.

A computer platform is the underlying hardware and software for a system. A computer platform defines a standard around which a system may be developed. A computer platform may be associated with different meanings that are dependent on the system that is to be developed. For instance, when the developed system will be software modules comprising a user interface, the computer platform may include a computing device or computer hardware on which the user interface will run. However, when the developed system will be software modules comprising an application program, the computer platform may include other application programs, a user interface, a computing device and/or computer hardware. A "cross-platform" system refers to software modules, formats, or computing devices that may operate on several platforms.

Other information representative of the state or actions associated with software module 201a may include configuration information accessed from configuration files. Configuration files may include options or constraints to be applied when testing the reliability of a version of a software module. For instance, it may be beneficial to test the reliability of a version of a software module in a memory constrained environment or when limited storage space is available. Such constraints are useful when testing the reliability of software modules that will be included in mobile devices, such as mobile telephones and PDA's. Configuration information may also include reference to customized functions that were previously developed for use with a version of a software module.

Creating language independent state tables from existing resource files significantly reduces the chance that human error will be introduced into the testing process and significantly reduces the operational complexity associated with testing a number of versions of a software module.

One method to facilitate measuring the reliability of a version of a software module is to cause the software module to perform an action and verify that the action performed as intended. Furthermore, causing a version of a software module to perform actions and verifying that the actions performed as intended may provide a more relevant measurement of reliability.

Figure 4:
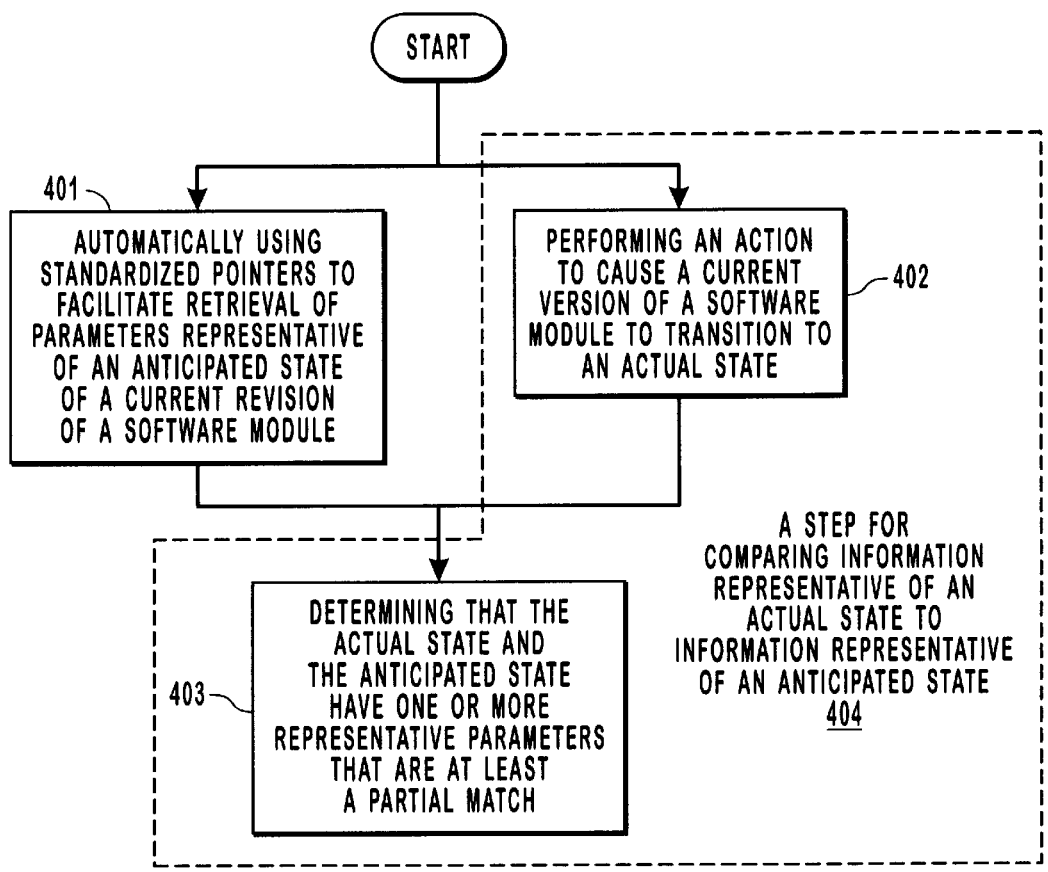
FIG. 4 is a flow diagram illustrating an example of a method for determining that a software module performed an action as intended.

Shown in FIG. 2B are some of the functional components that may be used to test the reliability of a version of a software module. Shown in FIG. 4 is a flow diagram illustrating a method for determining that a software module performed an action as intended. In one embodiment, the method illustrated in FIG. 4 may be repeated as needed to provide a more relevant measurement of the reliability of a version of a software module. The method in FIG. 4 will be discussed with reference to the functional components included in FIG. 2B.

The method illustrated in FIG. 4 may automatically use standardized pointers to facilitate retrieval of parameters representative of an anticipated state of a current version of a software module (act 401). The method illustrated in FIG. 4 may also perform an action to cause a current version of a software module to transition to an actual state (act 402). In the embodiment shown in FIG. 4, act 401 and act 402 may be performed in parallel. It should be understood that act 401 and act 402 are not dependent on one another; it may be the case that act 401 is performed before act 402 or that act 402 is performed before act 401. The present invention may be practiced when act 401 and act 402 are executed in any order.

Automatically using standardized pointers to facilitate retrieval of parameters representative of an anticipated state of a current version of a software module (act 401) may include using pointers included in a state table to facilitate access to information, such as objects, from a resource file. An anticipated state is a state a software module should transition into when an action is performed. Shown in FIG. 2B, state table runner 205 may access pointers 211, which are included in state table 204, via communications path 236. State table runner 205 may use pointers 211 to facilitate retrieval of objects 212b from resource file 202b via communication path 233. In one embodiment, parameters may be the values associated with retrieved objects 212b.

It may be that software modules 201a and 201b are versions of a software module that include essentially identical objects but use a different written language when outputting objects. For example, software module 201a may output objects in English and software module 201b output objects in French. In one embodiment, pointers 211 may have previously been accessed from resource file 202a, which may be the IDN file illustrated in FIG. 6. Since resource file 202b, which may be the IDN file illustrated in FIG. 7, includes pointers 211, state table 204 may still be used to facilitate testing software module 201b. Thus, a single state table may be used to facilitate measuring the reliability of several versions of a software module that output objects in different written languages. This significantly reduces the operational complexity associated with testing multiple versions of a software module and significantly reduces the chances of human error entering the testing process.

Performing an action to cause a current version of a software module to transition to an actual state (act 402) may include action module 214 facilitating performance of an action to cause software module 201b to transition to an actual state. Software module 201b may be caused to perform any action it may perform during operation in a non-testing environment. In the illustrated embodiment, action module 214 communicates with software module 201b via communication path 234. Action module 214 may send commands to software module 201b that simulate information software module 201b may receive during operation. For example, action module 214 may send data indicative of depressing a button on a mouse or a key on a keyboard. Action module 214 may also send information indicative of a call from another software module, which may or may not be associated with software module 201b. It should be understood that these are only examples of actions that may simulated. It would be obvious to those skilled in the art, after having reviewed this description, that the principles of the present invention provide for causing a software module to perform a wide variety of other simulated actions.

An actual state is the operating state software module 201b transitions into as a result of performing an action. For example, if action module 214 sent commands indicative of depressing a button on a mouse to software module 201b, software module 201b may respond by displaying a dialog box. The actual state of software module 201b would be the state in which software module 201b displays the dialog box.

The method in FIG. 4 may determine that the actual state and the anticipated state have one or more representative parameters that are at least a partial match (act 403). This may include verification module 215 receiving information indicative of software module 201b's actual state. Returning to the above example of the depressed mouse button, verification module 215 may receive information indicative of software module 201b displaying the dialog box. Verification module 215 may compare parameters received from resource file 202b representative of an anticipated state and parameters received from software module 201b representative of an actual state. If representative parameters are at least a partial match, the action that caused the transition to the actual state may have performed as intended. In the mouse button example, this may mean that the depressed mouse button was supposed to cause display of the dialog box.

In one embodiment, act 402 and act 403 may be included in a step for comparing information representative of an actual state to information representative of an anticipated state (step 404). In this embodiment, information in addition to parameters representative of states may be compared. Such additional information may be received from modules external to software module 201b and user interfaces associated with software module 201b.

For example, even if an action performed as intended, the actual memory usage when performing the action may be compared to an anticipated memory usage. Such a comparison may be of particular benefit when measuring the reliability of a software module in a memory-constrained environment, such as a mobile telephone or PDA. Other information may include disk space usage, bandwidth usage, or efficiency of operation associated with software module 201b or other modules external to software module 201b.

It should be understood these are only examples of information that may be compared in addition to parameters representative of the state of a software module. It would be obvious to those skilled in the art, after having reviewed this description, that the principles of the present invention provide for comparing a wide variety of information in addition to representative parameters and the types of information described above.

Depending on the strictness of the rules involved when comparing information or parameters, verifying that an action performed as intended may be facilitated in a variety of ways. If one or more representative parameters partially match or if some information partially matches, this may be enough to verify that an action performed as intended. In some cases, only a complete match may result in verification. In other cases, hybrid comparisons may be made, where some information and/or one or more parameters is a partial match and some information and/or one or more other parameters are an exact match. Comparisons to determine if information or parameters are a partial or complete match may be performed on objects of a display. For example, visual objects, such as text associated with the title or contents of a dialog box or any object, which receives a value that may be compared to other values to determine a level of commonality. Comparisons may also be performed on other objects associated with a user interface or computer platform. For example, actual memory or bandwidth usage may be compared to anticipated memory or bandwidth usage.

Partial equivalence may result when a portion a first parameter or set of information is the same as a portion of a second parameter or set of information. In one embodiment, comparing text strings for an exact match may not be possible or may be unnecessary. For example, "The Name of this Machine is: Computer_001" may be partially equivalent to "The Name of this Machine is: Machine_002". This partial equivalence may be enough to determine that an action performed as intended. In another embodiment, numbers, which are not exact matches, may be considered exact matches for testing purposes. For example, "46.0001" may be considered an exact match of "46.0002" when rounding to a predetermined number of decimal points. It should be understood these are only examples of comparison techniques that may be performed. It would be obvious to those skilled in the art, after having reviewed this description, that the principles of the present invention may be implemented with a wide variety of comparison techniques to determine if an action performed as intended.

Figure 5:
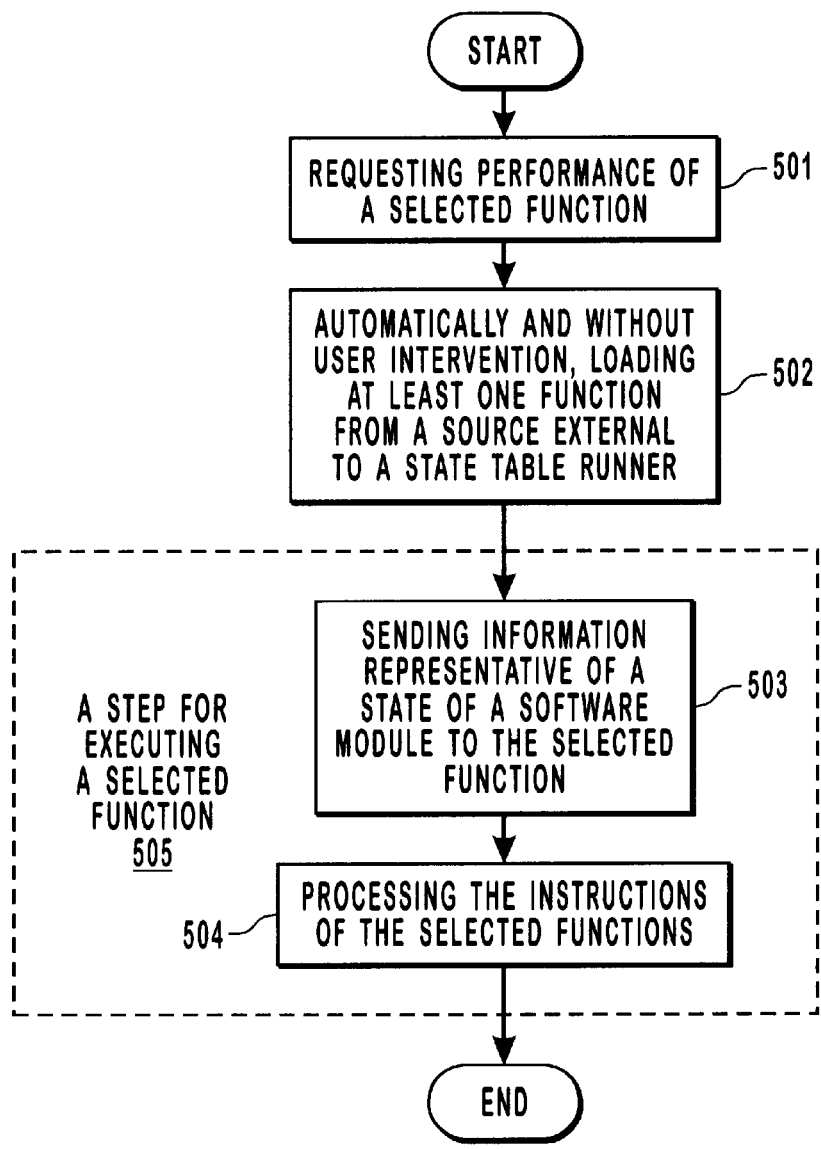
FIG. 5 is a flow diagram illustrating an example of a method for executing a customized function.

In some cases, it may be of benefit to execute customized actions or verifications that are not included in the functionality of a state table runner. For instance, a state table runner may not include the functionality to compare memory usage on a number of different computer platforms. However, these memory comparisons are of particular benefit because the software module is compatible with several devices that operate in memory-constrained environments. Shown in FIG. 2C are some of the functional components that may be used when performing a customized action or verification. Shown in FIG. 5 is a flow diagram illustrating a method for executing a customized function. The method in FIG. 5 will be discussed with reference to the functional components included in FIG. 2C.

The method begins by requesting performance of a selected function (act 501). This request may originate from a variety of locations including an external module, a state table runner, a user interface, or a computer platform. Illustrated in FIG. 2C is state table runner 205, which includes customized action module 224 and customized verification module 225.

The method in FIG. 5 may automatically and without user intervention load at least one function from a source external to a state table runner (act 502). In an example where state table runner 205 receives information indicating that an action or verification is to be performed, the functionality of state table runner 205 may be checked. If state table 205 does not include the indicated functionality, then at least one function may be loaded from loadable customized functions 206 via communication path 241. Loaded customized functions 206 may be one or more DLLs and may include customized functions associated with software module 201c, other modules, a user interface, or a computer platform. Loadable customized functions 206 may be referenced in a configuration file that is accessible to state table runner 205.

The method in FIG. 5 may perform a step for executing a selected function (step 505). In one embodiment, this may include an act of sending information representative of a state of a software module to the selected function (act 503) and processing the instructions of the selected function (act 504). Sending representative information may include sending standardized data representing a state of a software module to a common function header. A common function header may be a function header that is common to a number of versions of a software module. Standardized data may include a set of common data representative of a state of a software module, which customized functions associated with a number of versions of a software module are configured to receive. When sending information to a customized function, specialized modules such as customized action module 224 and customized verification module 225 may manage communication via communication path 241.

Instructions of the selected function may be processed to perform the selected function. This may include processing instructions to perform a customized action or customized verification. Thus, although a loadable customized function may receive standardized data via a common header, the functionality included therein may be designed for compatibility with different modules, user interfaces, and computer platforms. Facilitating customization through the use of loadable customized functions reduces the chance human error will be introduced into the testing process and reduces the coding resources needed to create a functional state table runner.

Using the methods of the present invention, several versions of a software module may be tested in an efficient manner with a reduced possibility of errors occurring in the testing process. In addition, state tables are introduced that include standardized pointers and use a single generated state table to test several versions of a software module, thereby significantly reducing operational complexity associated with testing. Furthermore, using a single state table with existing loadable program modules reduces the chance that erroneous data may be introduced into the testing process, as fewer versions of state tables and state table runners are needed for testing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired to be secured by United States Letters Patent is:

1. In a processing system that includes an active user interface, a method for generating a state table that may be used to facilitate testing of one or more of versions of a software module including a current version of the software module so as to reduce the operational complexity associated testing die reliability of the one or more versions of the software module, comprising:
   an act of accessing a resource file associated with a resource version of the software module, the resource file including standardized pointers to objects associated with the one or more of versions of the software module including the current version;
   an act of receiving the standardized pointers at a state table editor module; and
   an act of including the standardized pointers in a state table.

2. The method as recited in claim 1, wherein accessing a resource file associated with a resource version of the software module comprises the following:
   an act of accessing an IDN file associated with a resource version of the software module, the IDN file including keys to objects associated with the one or more versions of the software module including the current version of the software module.

3. The method as recited in claim 1, wherein receiving the standardized pointers at a state table editor module comprises the following:
   an act of receiving keys that are associated with objects included in an IDN file at a state table editor module.

4. The method as recited in claim 1, wherein including the standardized pointers in a state table comprises the following:
   an act of including keys that are associated with objects of an IDN file in state table.

5. In a processing system that includes an active user interface, a method for generating a state table that may be used to facilitate testing of one or more versions of a software module including a current version of the software module so as to reduce the operational complexity associated testing the reliability of one or more of versions of the software module, comprising:

an act of accessing a resource file associated with a resource version of the software module, the resource file including standardized pointers to objects associated with the one or more of versions of the software module including the current version; and a step for associating objects with states of the one or more of versions of the software module including the current version of the software module so as to make the state table independent of the written languages used by the one or more versions of the software module to output objects.

6. In a processing system that includes an active user interface and a file that includes parameters representative of each the states of a current version of a software module, a method for verifying that the current version of the software module performed an action as intended so as to reduce the operational complexity associated with the verification, comprising:

an act of, automatically using a pointer, which is standardized for use with a plurality of versions of the software module, to facilitate retrieval of parameters representative of an anticipated state the current version of the software module should transition into when the action is performed;

an act of performing the action to cause the current version of the software module to transition to an actual state; and an act of determining that the actual state and the anticipated state have one or more representative parameters that are at least a partial match.

7. The method as recited in claim 6, wherein automatically using a pointer, which is standardized for use with a plurality of versions of the software module comprises the following:

an act of automatically using a pointer that was included in a resource version of the software module to facilitate retrieval of representative parameters.

8. The method as recited in claim 7, wherein automatically using a pointer that was included in a resource version of the software module comprises the following:

an act of automatically using a pointer that was stripped from a resource version of the software module and included in a state table to facilitate retrieval of representative parameters.

9. The method as recited in claim 6, wherein automatically using a pointer, which is standardized for use with a plurality of versions of the software module comprises the following:

an act of automatically using a pointer, which is standardized for use with a plurality of versions of the software module, to facilitate retrieval of representative parameters from a file that includes text strings associated with a written language.

10. The method as recited in claim 9, wherein automatically using a pointer, to facilitate retrieval of representative parameters from a file that includes text strings associated with a written language comprises the following:

an act of automatically using a pointer to retrieve parameters representative of the anticipated state from a file that includes text strings associated with a written language and associated with the current version of the software module.

11. The method as recited in claim 6, wherein automatically using a pointer, which is standardized for use with a plurality of versions of the software module comprises the following:

an act of automatically referencing a resource file with a key, which is standardized for use with a plurality of versions of the software module, to facilitate retrieval of representative parameters.

12. The method as recited in claim 11, automatically referencing a resource file with a key, which is standardized for use with a plurality of versions of the software module, comprises the following:

an act of automatically referencing a resource file with a key, which is standardized for use with a plurality of versions of the software module, to facilitate retrieval of representative parameters that were stripped from a resource version of the software module.

13. The method as recited in claim 11, automatically referencing a resource file with a key, which is standardized for use with a plurality of versions of the software module, comprises the following:

an act of automatically referencing a resource file with a key included in a state table to retrieve representative parameters, the key being standardized for use with a plurality of versions of the software module.

14. The method as recited in claim 6, wherein automatically using a pointer, which is standardized for use with a plurality of versions of the software module, comprises the following:

an act of automatically using a pointer, which is standardized for use with a plurality of versions of the software module, to retrieve a representative title of a dialog box from a file.

15. The method as recited in claim 6, wherein automatically using a pointer, which is standardized for use with a plurality of versions of the software module, comprises the following:

an act of automatically using a pointer, which is standardized for use with a plurality of versions of the software module, to retrieve representative contents of a dialog box from a file.

16. The method as recited in claim 6, wherein automatically using a pointer, which is standardized for use with a plurality of versions of the software module, comprises the following:

an act of automatically using a pointer, which is standardized for use with a plurality of versions of the software module, to retrieve representative parameters from a file that includes text encoded as characters of a unified character set.

17. The method as recited in claim 16, wherein automatically using a pointer to retrieve representative parameters from a file that includes text encoded as characters of a unified character set comprises the following:

act of automatically using a pointer, which is standardized for use with a plurality of versions of the software module, to retrieve representative parameters from a file that includes text encoded as characters of the Unicode character set.

18. The method as recited in claim 6, wherein automatically using a pointer, which is standardized for use with a plurality of versions of the software module, comprises the following:

an act of automatically using a key associated with a state table, the key being standardized for use with a plurality of versions of the software module, to retrieve representative text associated with a written language from a file.

19. The method as recited in claim 18, wherein automatically using a key associated with a state table to retrieve representative text associated with a written language from a file comprises the following:

an act of automatically using a key associated with a state table, the key being standardized for use with a plurality of versions of the software module, to retrieve representative text that was stripped from a resource version of the software module.

20. The method as recited in claim 19, wherein automatically using a key associated with a state table to retrieve representative text that was stripped from the software module comprises the following:

an act of automatically using a key associated with a state table to retrieve representative text from an IDN file.

21. The method as recited in claim 6, wherein performing the action to cause the current version of the software module to transition to an actual state comprises the following:

an act of the processing system performing an action to cause the current version of the software module to transition to an actual state.

22. The method as recited in claim 6, wherein performing the action to cause the current version of the software module to transition to an actual state comprises the following:

an act of a state table runner performing an action to cause the current version of the software module to transition to an actual state.

23. The method as recited in claim 6, wherein determining that the actual state and the anticipated state have one or more representative parameters that are at least a partial match comprises the following:

an act of determining that the actual state and the anticipated state have one or more representative text parameters that are at least a partial match.

24. The method as recited in claim 6, wherein determining that the actual state and the anticipated state have one or more representative parameters that are at least a partial match comprises the following;

an act of determining that the actual state and the anticipated state have one or more representative parameters that are an exact match.

25. The method as recited in claim 24, wherein determining that the actual state and the anticipated state have one or more representative parameters that are at least a partial match comprises the following:

an act of determining that the actual state and the anticipated state have one or more representative text parameters that are an exact match.

26. The method as recited in claim 6, wherein determining that the actual state and the anticipated state have one or more representative parameters that are at least a partial match comprises the following:

an act of determining that the actual state has a representative parameter that is at least a partial match to a portion of a title of a dialog box.

27. The method as recited in claim 6, wherein determining that the actual state and the anticipated state have one or more representative parameters that are at least a partial match comprises the following:

an act of determining that the actual state has a representative parameter that is at least a partial match to a portion of the contents of a dialog box.

28. In a processing system that includes an active user interface and a file that includes parameters representative of each of the operating states of a current version of a software module, a method for verifying that the current version of the software module performed an action as intended so as to reduce the operational complexity associated with the verification, comprising:

an act of automatically using a pointer, which is standardized for use with a plurality of versions of the software module, to facilitate retrieval of parameters representative of an anticipated state the current version of the software module should transition into when the action is performed; and a step for comparing information representative of an actual state and information representative of the anticipated state so as to determine that the actual state and the anticipated state have a level of commonality that satisfies predetermined criteria.

29. In a processing system that includes an active user interface and a state table runner that configured with certain functionality for causing software modules to perform certain actions and for automatically verifying the state of the software modules, a method for performing a selected function with the state table runner when the selected function was not originally included in the functionality of the state table runner, the method comprising:

an act of requesting performance of a selected function;

an act of determining that the functionality of the state table runner does not include the selected function.

an act of loading the selected function from a source that is external to the state table runner; and a step for executing a selected function so as to generate information associated with the software module's transition into a current state by sending information representative of a state of a software module to the selected function and by processing the instructions of the selected function.

30. The method as recited in claim 29, wherein requesting performance of the selected function comprises the following:

an act of processing system requesting performance of the selected function.

31. The method as recited in claim 29, wherein requesting performance of the selected function comprises the following:

an act of a state table runner requesting performance of the selected function.

32. The method as recited in claim 29, wherein loading the selected function from a source external to the state table runner comprises the following:

an act of, automatically and without user intervention, loading a dynamic link library that includes customized functions.

33. The method as recited in claim 29, wherein loading the selected function from source external to the state table runner comprises the following:

an act of, automatically and without user intervention, loading at least one customized function associated with a software module included in the processing system, from a source external to the state table runner.

34. The method as recited in claim 33, wherein loading the selected function associated with a software module comprises the following:

an act of, automatically and without user intervention, loading at least one customized function referenced in a configuration file associated with a software module included in the processing system, from a source external to the state table runner.

35. The method as recited in claim 29, wherein loading the selected function from a source external to the state table runner comprises the following:

an act of, automatically and without user intervention, loading at least one customized function associated with the active user interface from a source external to the state table runner.

36. The method as recited in claim 29, wherein loading the selected function associated with the active user interface from a source external to the state table runner comprises the following:

an act of, automatically and without user intervention, loading at least one customized function associated with a computer system platform that includes the active user interface, from a source external to the state table runner.

37. The method as recited in claim 29, wherein sending information representative of the state of the software module to the selected function comprises the following:

an act of, sending information representative of the state of the software module to a selected function that includes a function header, which is common for a plurality of user interfaces including the active user interface.

38. The method as recited in claim 29, wherein sending information representative of the state of the software module to the selected function comprises the following:

an act of, sending information representative of the state of the software module to the selected function, the representative information being standardized for the plurality of versions of the software modules.

39. The method as recited in claim 29, wherein processing the instructions of the selected function comprises the following:

an act of processing the instructions of a selected function to cause a software module to perform a customized action.

40. The method as recited in claim 29, wherein processing the instructions of the selected function comprises the following:

an act of processing the instructions of a selected function to cause performance of a customized verification of a state of a software module.

41. A computer program product for implementing, in a processing system that includes an active user interface, a method for generating a state table that may be used to facilitate testing of one or more versions of a software module including a current version of the software module so as to reduce the operational complexity associated with testing the reliability of one or more versions of the software module, the computer program product comprising:

a computer-readable medium carrying computer-executable instructions, that when executed at the processing system, cause the processing system to perform the method, including:

an act of accessing a resource file associated with a resource version of the software module, the resource file including pointers to standardized objects associated with the one or more versions of the software module including the current version;

an act of receiving the standardized pointers; and an act of including the standardized pointers in a state table.

42. The computer program product as recited claim 41, wherein the computer-readable medium is a physical storage media.

43. A computer program product for implementing, in a processing system that includes an active user interface and a file that includes parameters representative of each of the operating states of a current version of a software module, a method for verifying that the current version of the software module performed an action as intended so as to reduce the operational complexity associated with the verification, the computer program product comprising:

a computer-readable medium carrying computer-executable instructions, that when executed at the processing system, cause the processing system to perform the method, including:

an act of using a pointer, which is standardized for use with a plurality of versions of the software module, to facilitate retrieval of information representative of an anticipated state the current version of the software module should transition into when the action is performed;

an act of transitioning the current version of the software module to an actual state; and an act of determining that the actual state and the anticipated state have representative information that is at least partially equivalent.

44. The computer program product as recited claim 43, wherein the computer-readable medium is a physical storage media.

45. A computer program product comprising:

a computer-readable medium carrying computer-executable instructions, that when executed at the processing system, cause the processing system to perform the method recited in claim 29.

46. The computer program product as recited claim 45, wherein the computer-readable medium is a physical storage media.

* * * * *